United States Patent [19]

Howson et al.

[11] Patent Number: 5,189,137

[45] Date of Patent: Feb. 23, 1993

[54] METHOD FOR PREPARING A HIGH MOLECULAR WEIGHT POLYETHERIMIDE POLYMER IN A DUAL SOLVENT SYSTEM

[75] Inventors: Paul E. Howson, Latham; Patricia D. Mackenzie, Clifton Park, both of N.Y.

[73] Assignee: General Electric Company, Schenectady, N.Y.

[21] Appl. No.: 772,175

[22] Filed: Oct. 7, 1991

[51] Int. Cl.⁵ .................. C08G 73/10; C08G 8/02; C08G 14/00

[52] U.S. Cl. .................................. 528/171; 528/125; 528/126; 528/128; 528/172; 528/175; 528/179; 528/180; 528/181; 528/182; 528/185; 528/188; 528/207; 528/208; 528/350; 528/351; 528/352; 528/353

[58] Field of Search ............... 528/125, 126, 188, 128, 528/185, 171, 179, 172, 175, 207, 208, 180–182, 350–353

[56] References Cited

U.S. PATENT DOCUMENTS

| | | | |
|---|---|---|---|
| 3,847,867 | 11/1974 | Heath | 528/185 |
| 3,933,749 | 1/1976 | Williams, III | 528/353 |
| 3,983,093 | 9/1976 | Williams, III | 528/353 |
| 4,221,897 | 9/1980 | Takekoshi | 528/125 |
| 4,417,044 | 11/1983 | Parekh | 528/185 |
| 4,550,156 | 10/1985 | Gallagher | 528/185 |
| 4,565,858 | 1/1986 | Klopfer | 528/172 |
| 4,612,361 | 9/1986 | Peters | 528/125 |
| 4,650,850 | 3/1987 | Howson | 528/125 |
| 4,757,150 | 7/1988 | Guggenheim | 528/185 |

*Primary Examiner*—John Kight, III
*Assistant Examiner*—P. Hampton-Hightower
*Attorney, Agent, or Firm*—William H. Pittman

[57] ABSTRACT

A method for preparing high molecular weight polyetherimide polymers in a dual solvent system is disclosed. The inventive method provides for polymerizing a diamine monomer and a dianhydride monomer in a solvent system comprised of at least two solvents, a first solvent is selected for its solubility characteristics such that the polyetherimide polymer is highly soluble therein and a second solvent is selected for its relatively high boiling point characteristics such that when the second solvent and first solvent are mixed together, the boiling point of the dual solvent system is at least as high as the temperature at which polymerization of said monomers occurs. In one embodiment, a diamine monomer of 4,4'-sulfonyl dianiline (SDAN) is reacted with a dianhydride monomer of bisphenol A dianhydride (BPADA) in the presence of a catalyst and a chain stopper in a dual solvent system comprised of chloroform and ortho-dichlorobenzene. The resulting polyetherimide has an intrinsic viscosity exceeding 0.76 dl/g in chloroform at 25° C.

16 Claims, No Drawings

METHOD FOR PREPARING A HIGH MOLECULAR WEIGHT POLYETHERIMIDE POLYMER IN A DUAL SOLVENT SYSTEM

BACKGROUND OF THE INVENTION

The present invention relates generally to a solution polymerization method for high molecular weight polyimides. More particularly, the invention relates to a method for preparation of a high molecular weight polyetherimide by polymerizing diamine monomers and dianhydride monomers in a dual solvent system.

Polymerization of polyetherimides by melt polymerization or conventional solution polymerization processes using aromatic bis(ether anhydride) monomers (hereinafter "dianhydride") and organic diamine monomers is known in the art. See for example, Howson, U.S. Pat. No. 4,650,850; and Klopfer, U.S. Pat. No. 4,565,858. Polyetherimide polymers represented by formula I can be made by effecting a polymerization reaction between said dianhydride and diamine monomer,

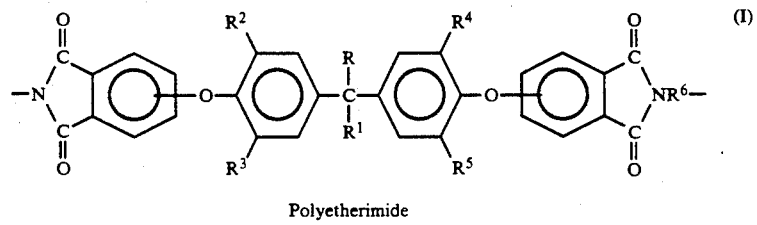

Polyetherimide where $R-R^5$ are independently H or $C_{(1-4)}$ alkyl radicals, $R^6$ is a divalent arylene radical selected from the class consisting of $C_{(6-14)}$ hydrocarbon radicals, substituted $C_{(6-14)}$ hydrocarbon radicals and a divalent radical having the formula $$-R^7QR^8- \quad (II)$$

where $R^7$ and $R^8$ are the same or different $C_{(6-14)}$ divalent aromatic hydrocarbon radicals or substituted $C_{(6-14)}$ divalent aromatic hydrocarbon radicals, Q is a member selected from

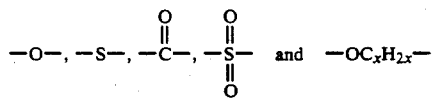

and x is a whole number equal to 1 to 5 inclusive.

As described by Howson in U.S. Pat. No. 4,650,850 and in Heath et al., U.S. Pat. No. 3,847,867, polyetherimides comprising chemically combined etherimide units are useful for the production of injection molded high performance thermoplastics. The utility of these polymers in high heat applications is due, at least in part, to their relatively high glass transition temperature (Tg). Consequently, polyetherimide polymers are also useful in electronic applications. In addition, polyetherimides have been found to be useful in semiconductor fabrication due to its recently discovered adhesive properties.

In general, the higher the molecular weight, the better performance of a polymer, especially in terms of its mechanical properties. However, an ultimate upper limit is imposed on the molecular weight of polyetherimide polymers due to limitations in known melt and solution polymerization processes.

Melt polymerization processes are conducted at temperatures which exceed the melt temperature of the monomers being polymerized in order to promote polymerization by causing the nitrogen containing ring of the diamine monomer to close. This is referred to as imidization. However, due to the relatively high melt temperature of the polyetherimide polymer being produced, the melt viscosity during a typical melt polymerization process frequently becomes too high for extensive polymerization to occur.

The melt viscosity of a polymer is an indication of its ease of processability in the melt. A polymer with a high melt viscosity can become difficult to mix thus hindering further polymerization of the monomers. The following universal relationship between the molecular weight and the melt viscosity for a polyetherimide polymer is expected:

$$Z = kM^{3.4} \quad (IV)$$

where Z is the melt viscosity, M is the molecular weight and k is a constant.

The melt viscosity of the polyetherimide polymer therefore increases by a power of 3.4 as the molecular weight increases during polymerization. For example, a 10% increase in molecular weight results in a 38% increase in the melt viscosity. Thus, limiting the molecular weight of the polymer is extremely important for trouble-free, safe operation of melt polymerization processes and for the production for a viable polyetherimide product.

Solution polymerization methods also have significant shortcomings when used to prepare high molecular weight polyetherimides. Solution polymerization processes must use a solvent with a sufficiently high boiling point below which imidization of the monomers occurs. Frequently, the solvents with elevated boiling points do not exhibit good solubility characteristics with the polymerized product. As the molecular weight of a polymer increases through polymerization, the intrinsic viscosity of the polymer also increases according to the following Mark-Houwink equation:

$$IV = (K)M^\alpha \quad (V)$$

wherein IV is intrinsic viscosity, K is a constant, M is the molecular weight and $\alpha$ is constant for a given polymer.

The intrinsic viscosity of a polymer is the limiting value at infinite dilution of the ratio of the specific viscosity of the polymer solution to its concentration in moles per liter. Intrinsic viscosity $(n_1)$ is defined as:

$$n_1 = C \xrightarrow{\text{Lim}} 0 \frac{n^{sp}}{C} \quad (VI)$$

where $n^{sp}$ is the specific viscosity and c is the concentration in moles per liter.

Solution polymerization of high molecular weight polyetherimides in the conventional solvents having a sufficiently high boiling point of at least about 130° C. such as orthodichlorobenzene (BP=180.5° C.) fail because the ever increasing viscosity of the polymer solution makes it impossible to stir, thereby hindering uniform mixing. Thus, extensive polymerization is impossible.

Presently, high molecular weight polyetherimides are prepared from 4,4'-sulfonyl dianiline (SDAN) and 2,2-bis[4-(3,4-dicarboxyphenoxy)phenyl] propane dianhydride commonly referred to as bisphenol A dianhydride (BPADA) and having the following formula:

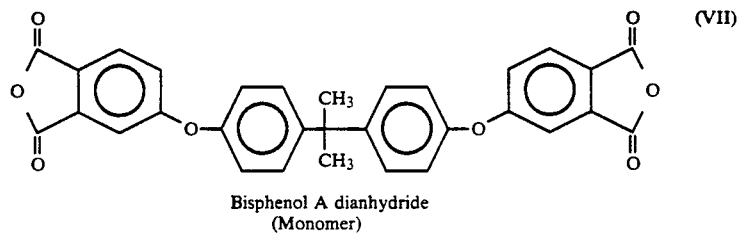

Bisphenol A dianhydride
(Monomer)

These polyetherimides cannot be synthesized conveniently by either melt or solution polymerization methods to achieve an intrinsic viscosity (IV) of greater that 0.55 deciliters per gram (>0.55 dl./g.).

Therefore, since a higher molecular weight polyetherimide polymer is desired there is an outstanding need for an improved method to polymerize polyetherimides to achieve a higher molecular weight. Ideal polymerization conditions would provide for a system having a temperature at least as high as the temperature at which polymerization occurs while at the same time having solubility characteristics which maintain a homogeneous stirrable mixture of monomer and polymerized product throughout the course of the entire polymerization. In general there is no teaching in the prior art of a method for polymerizing a high molecular weight polyetherimide using such a system.

SUMMARY OF THE INVENTION

A principal object of the present invention is to provide an improved method for polymerizing high molecular weight polyetherimide polymers having a higher molecular weight and thus, higher intrinsic viscosity than polyetherimides presently prepared by known melt polymerization or solution polymerization methods.

It is a feature of the improved inventive method to use a dual solvent system having desirable solubility characteristics for the polymerized polyetherimide product and a sufficiently high boiling point to permit polymerization of the dissolved monomers to occur.

A principal advantage of the inventive method is that it allows the practitioner skilled in the art to select a dual solvent system comprised of solvents which are tailored to meet the polymerization temperature and the solubility requirements of the specific polymerization reaction.

A further advantage of the improved inventive method is that it provides for a high yield of polyetherimides at a relatively low cost.

A need for an improved method to polymerize high molecular weight polyetherimides is satisfied in accordance with the principles of the present invention by providing a method for preparing a high molecular weight polyetherimide polymer comprising the steps of: dissolving a diamine monomer and a dianhydride monomer in a dual solvent system comprised of at least two solvents, a first solvent having solubility characteristics such that said polyetherimide polymer is highly soluble therein, and a second solvent having a relatively high boiling point characteristic such that when said first and second solvents are mixed together, the boiling point of the dual solvent system is at least as high as the temperature at which the polyetherimide is formed; and heating said dual solvent system containing said dianhydride and diamine monomers to a temperature at which polymerization to said polyetherimide polymer occurs.

In another aspect of the invention method for preparing a high molecular weight polyetherimide polymer is provided comprising the steps of: dissolving 4,4'sulfonyl dianiline monomer and bisphenol A dianhydride monomer in a dual solvent system comprised of a minor amount of chloroform and a major amount of dichlorobenzene; heating said dual solvent system containing said monomers to a temperature of at least about 125° C.; and refluxing said system wherein any aqueous condensation in the distillate is removed and any evaporated solvent is recirculated into said dual solvent system.

DETAILED DESCRIPTION OF THE INVENTION

In its broadest sense, the invention is directed to a method for polymerizing high molecular weight polyimides in a dual solvent system.

According to the inventive method, the problem associated with polymerization of high molecular polyimides becoming insoluble during the polymerization process before reaching a desirable molecular weight is overcome by a new method of solution polymerization using a dual solvent system wherein one solvent is selected for its solubility characteristics and the second solvent is selected for its boiling point characteristics.

Preparation of a polyimide according to the inventive solution polymerization method may be accomplished according to the following equation:

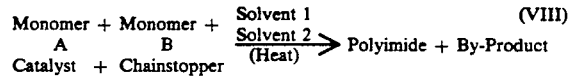

wherein monomer A is an organic diamine of the formula

NH$_2$R$^6$NH$_2$                 (IX)

wherein R$^6$ is as defined above. Most preferably, the diamine used is 4,4'-sulfonyl dianiline (SDAN) of the formula

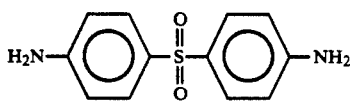
                                       (X)

4,4'-SulfonylDianiline (SDAN) (Monomer)

However, other suitable organic diamines which are included in formula IX are by way of example:
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether,
1,5-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl) ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine; and
mixtures of such diamines.
Monomer B is a bis(ether anhydride) of the formula

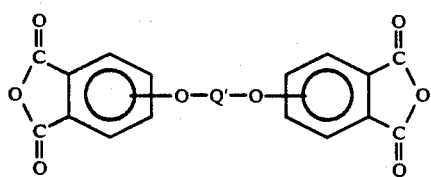

wherein Q' is

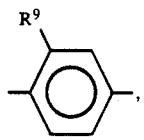

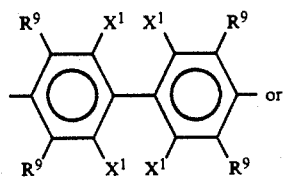

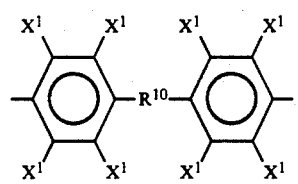

each R$^9$ is independently hydrogen or methyl, R$^{10}$ is a straight-chain or branched alkylene radical containing 1–5 carbon atoms and each X' is independently hydrogen, C$_{(1-4)}$ alkyl radical, or halogen (usually chlorine or bromine). Suitable dianhydrides includes, for example, 3,3',4,4'-tetracarboxybenzophenone dianhydride, 3,4-dicarboxyphenyl ether dianhydride, and 2,2-bis[4-dicarboxyphenoxy)phenyl]propane dianhydrides, either the 2,3-dicarboxy or the 3,4-dicarboxy isomer may be employed. The most preferred is bisphenol A dianhydride defined above as "BPADA", having a formula according to (VII) above.

Other suitable dianhydrides are, for example, those compounds or mixtures of:
2,2-bis[4-(3,4-dicarboxyphenoxy-3,5-dimethyl)phenyl]-propane;
2,2-bis[4-(3,4-dicarboxyphenoxy-3,5-diethyl)phenyl]-propane;
2,2-bis[4-(3,4-dicarboxyphenoxy-3,5-dipropyl)phenyl]-propane;
2,2-bis[4-(3,4-dicarboxyphenoxy-3,5-diisopropyl)-phenyl]propane;
2,2-bis[4-(3,4-dicarboxyphenoxy-3,5-dibutyl)phenyl]-propane;
2,2-bis[4-(3,4-dicarboxyphenoxy-3,5-diisobutyl)phenyl]-propane;
2,2-bis[4-(3,4-dicarboxyphenoxy-3,5-di-tertbutyl)-phenyl]propane;
2,2-bis[4-(3,4-dicarboxyphenoxy-3,5-dimethyl)phenyl]-butane;
3,3-bis[4-(3,4-dicarboxyphenoxy-3,5-dimethyl)phenyl]-pentane.

The synthesis of the aromatic dianhydride of formula XI can be achieved by using the procedure shown by Heath et al., U.S. Pat. No. 3,879,428, assigned to the same assignee as the present invention and incorporated herein by reference. Heath et al. effects the nitro displacement of a nitrophthalimide with an alkali diphenoxide to form the corresponding bisimide, followed by the hydrolysis of the bisimide to the dianhydride. A preferred procedure for making the aromatic ether bisimide is by the method shown by Williams, U.S. Pat. No. 4,273,712, also assigned to the same assignee as the present invention and incorporated herein by reference. The Williams procedure involves the displacement of reactive radicals on a phthalimide nucleus with a bisalkali metal phenoxide in the presence of a non-polar solvent and a phase transfer catalyst.

Included in the alkali metal salts of the dihydric phenols utilized in making the aromatic bisimides and aromatic dianhydrides of formula XI are the alkali metal salts of dihydric phenols or mixtures thereof such as:
2,2-bis(4-hydroxy-3,5-dimethylphenyl)propane;
2,2-bis(4-hydroxy-3,5-diethylphenyl)propane;
2,2-bis(4-hydroxy-3,5-dipropylphenyl)propane;
2,2-bis(4-hydroxy-3,5-diisopropylphenyl)propane;
2,2-bis(4-hydroxy-3,5-dibutylphenyl)propane;
2,2-bis(4-hydroxy-3,5-diisobutylphenyl)propane;
2,2-bis(4-hydroxy-3,5-di-t-butylphenyl)propane;
2,2-bis(4-hydroxy-3,5-dimethylphenyl)butane;
3,3-bis(4-hydroxy-3,5-dimethylphenyl)pentane.

There can be employed about 1–0.98 moles of aromatic dianhydride (monomer B) per mole of organic diamine (monomer A).

Polyetherimides resulting from the preferred reaction of the 4,4'-sulfonyl dianiline and bisphenol A dianhydride comprise chemically combined etherimide units of the following formula:

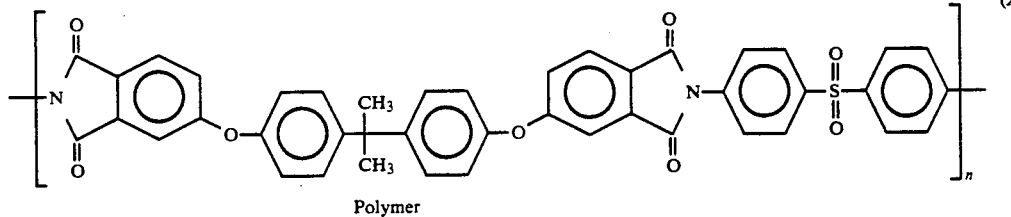

Polymer (XII)

Preferably, a catalyst which can be selected from aminopyridine compounds and oxygenated phosphorous compounds is added to the reaction mixture in accordance with U.S. Pat. No. 4,324,882, and U.S. Pat. No. 4,565,858, both of which are assigned to assignee of this application and which are incorporated by reference herein. The preferred catalyst is 4-dimethylaminopyridine of the formula

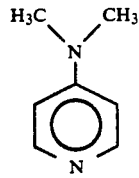

4-Dimethylaminopyridine (DMAP) (XIII)

Other suitable catalysts include phenylphosphinates of alkali metals such as lithium, sodium and potassium of the formula

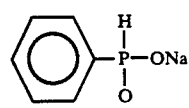

Sodium Phenylphosphinate (XIV)

The amount of catalyst added to the system is equal to about 0.01–2% by weight of the solids in the dual solvent system comprised monomers A and B added to the system.

It is also within the scope of the invention to include in the reaction mixture chain stoppers. Monoanhydrides such as phthalic anhydride are preferred according to the formula

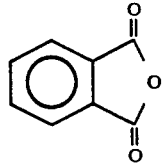

Phthalic Anhydride (PA) (XV)

Other satisfactory chain stoppers may be selected typically from anilines and monofunctional aromatic amines of the formulas

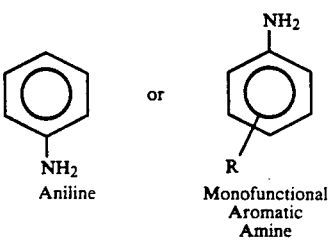

Aniline   Monofunctional Aromatic Amine (XVI)

where R is a functional group, such as an amine or an anhydride providing reactivity for polymerization or compatibility for polymer blending. Also, R can be a group which imparts desirable properties, such as flow promotion, UV stabilization, heat stabilization or antistatic characteristics.

If the chain stopper is an amine, the amount of chain stopper added to the system should be in the range of about 0–5 mole percent of the total amount of anhydride monomer. If, on the other hand, the chain stopper is an anhydride, then the amount of chain stopper added to the system should be in the range of about 0–5 mole percent of the amount of amine monomer.

One skilled in the art may easily by simple experimentation identify suitable solvents in which the desired polymer is readily soluble. If the solvent having the desired solubility characteristics does not have a boiling point which is sufficiently high to permit heating of the system to cause imidization to occur, then it can be mixed with a second solvent having a sufficiently higher boiling point.

In a reaction mixture comprised of SDAN and BPADA, a first solvent is preferably selected for its solubility characteristics from the group comprising halogenated organic compounds such as chloroform ($CHCl_3$).

The second solvent is selected for its boiling point characteristics. Suitable solvents include halogenated aromatics because of their relatively higher boiling points. Where chloroform is the selected solubility solvent, ortho-dichlorobenzene (BP=180.5° C.) is preferred.

Using Raoult's Law, which assumes ideal solutions, the boiling point or bubble point of the binary system at a given pressure can be calculated. Raoult's Law for a multicomponent or dual solvent system may be stated as follows:

$$(xP^v)_1 + (xP^v)_2 = P_t \quad \text{(XVII)}$$

where x is the mole fraction in the liquid phase and $p^v$ is the vapor pressure which depends on temperature for the given component. The subscript refers to the component. $P_t$ is the total system pressure.

Below is a table of calculated bubble points for the system where the first solvent is $CHCl_3$ and the second solvent is ortho-dichlorobenzene (ODCB) at a pressure of 1 atmosphere. T(°C.) is the bubble point, (sometimes referred to as the boiling point) of the dual solvent system, and y is the mole fraction in the vapor phase.

| wt % $CHCl_3$ | T(°C.) | x $CHCl_3$ | y $CHCl_3$ |
|---|---|---|---|
| 0 | 181 | 0 | 0 |
| 2 | 168 | 0.025 | 0.298 |
| 3 | 162 | 0.037 | 0.405 |
| 5 | 152 | 0.061 | 0.560 |
| 7 | 144 | 0.085 | 0.663 |
| 10 | 133 | 0.12 | 0.765 |
| 15 | 120 | 0.178 | 0.857 |
| 20 | 111 | 0.235 | 0.905 |
| 25 | 103 | 0.291 | 0.933 |
| 30 | 97 | 0.345 | 0.951 |
| 35 | 92 | 0.399 | 0.963 |
| 40 | 88 | 0.451 | 0.972 |
| 45 | 84 | 0.502 | 0.978 |
| 50 | 81 | 0.552 | 0.983 |
| 60 | 76 | 0.649 | 0.989 |
| 70 | 71 | 0.742 | 0.994 |
| 80 | 68 | 0.831 | 0.996 |
| 90 | 65 | 0.917 | 0.999 |
| 100 | 62 | 1 | 1 |

In general, knowing the boiling points of the first solvent and the second solvent, a solvent mixture and the relative amounts can be tailored to meet the reaction temperature requirements and the solubility requirements for polymerization of the polyetherimide.

Once the reactant monomers, catalyst and chain stopper, if any, are added to the dual solvent system, the conditions for polymerization of the polyetherimide polymer of the inventive method should be carefully monitored for optimum results. The reaction mixture containing the dual solvent system, reactant monomers, catalyst, and chain stopper, should be heated to a temperature sufficiently high to cause polymerization to occur and said temperature should be essentially maintained throughout the reaction.

When SDAN and BPADA are added to a dual solvent system comprised of 10% chloroform by weight and ortho-dichlorobenzene, the polymerization reaction takes place readily at about 130° C.

The heated mixture should be simultaneously refluxed such that trace amounts of any by-products, such as water, generated in the condensation reaction during the imidization process are removed to permit extensive polymerization. During the removal of the water, the refluxed vapor typically contains vapor from the solvent with the lower boiling point (example: $CHCl_3$). Thus, in order to maintain a constant boiling point in the dual solvent system, the evaporated solvent should be recycled and returned to the reactor vessel after passage through a bed of molecular sieves once the bulk of the by-product distillate is removed (i.e., water). Alternatively, the amount of removed solvent can be replaced by fresh solvent.

As the polymerization process proceeds the solution becomes progressively more viscous, however, the mixture containing the product and unreacted monomers remains stirrable until the reaction is terminated. The formed polymer can be diluted after termination by adding additional amounts of the first solubility solvent and can be precipitated by depositing the mixture in a solvent of low solubility, such as methanol.

The following examples illustrate, without limitation, the principles and practices of the inventive method. High molecular weight polyimides were prepared according to the examples below exhibiting the outstandingly high intrinsic viscosity (IV) values exceeding 0.55 dl./g. in chloroform and a gel permeation chromatography molecular weight (polystyrene standards) exceeding 66,000.

EXAMPLE 1

BPADA: 50.0 grams; 0.0961 moles
SDAN: 24.0 grams; 0.0968 moles
ODCB: 225 grams; 20% solids
$CHCl_3$: 45 grams
PA: 0.225 grams; 0.0015 moles; 1.55 mole %
DMAP: 0.965 grams The reactants and solvents were first combined and mixed in a 500 ml. round bottom flask. A dual solvent system comprised of 10 weight percent chloroform in a second solvent of ortho-dichlorobenzene was prepared. SDAN and BPADA were added to the dual solvent solution thus comprising 20 weight percent solids. The solvent system containing the monomers was slowly heated to a temperature of about 130° C. which was maintained throughout the reaction. As the intermediate product of polyamic acid formed, it blended into the solution, thus remaining easy to stir. The polymerizing solution did not show marked insolubility, as is often the case with polyetherimides prepared in ortho-dischlorobenzene only. Water from imidization was seen in the first distillate when the reactor temperature was 110° C. As the distillate (mostly chloroform and water) accumulated, it was removed and an equal volume of chloroform was added to the reactor in order to maintain approximately 20% solids and 10 weight percent chloroform. The solvent was refluxed using a standard reflux condenser. Generally, the amount of chloroform added to the system equalled the amount of distillate removed. Occasionally, more or less chloroform was added to the system to maintain the temperature at about 130° C. Whenever chloroform was added, the distillation rate increased greatly which helped in removing further water molecules. 295 mls. of distillate (solvent and water) were removed and exchanged for chloroform during the reaction. Almost all of the water was removed in the first 3-4 hours, at reaction temperatures below 130° C. Once the bulk of the water was removed, the chloroform distillate was returned directly to the reaction mixture, after passing through a bed of 4 Å×1/16" molecular sieves. At this point, the reaction temperature remained constant at 132° C. The solution became progressively more viscous, but was still "stirrable" when the reaction was terminated. Total reaction time was 27 hours. The solution was then diluted with 100 mls. of chloroform and anti-solvent precipitated with methanol in a blender. The polymer was redissolved in chloroform and reprecipitated. It was vacuum dried at 50° C. for 42 hours. Under these reaction conditions, an SDAN/BPADA polyetherimide with an IV of 0.66 dl./g. in chloroform at 25° C. having a Tg of 251° C. and a GPC molecular weight of 66,900 (polystyrene standards) was obtained.

EXAMPLE 2

BPADA: 50.0 grams; 0.0961 moles
SDAN: 24.0 grams; 0.0968 moles
ODCB: 255 grams; 20% solids
CHCl₃: 45 grams
PA: 0.225 grams; 0.0015 moles; 1.55 mole %
DMAP: 0.965 grams Solution polymerization in dual solvent system using the above amounts of monomers, solvents, catalyst, chain stopper, was rerun with a different batch of diamine (SDAN) according to the procedure of Example 1. In this case, SDAN/BPADA polyetherimide had an IV of 0.761 dl./g. in chloroform. The higher IV value is most likely a result of using a purer batch of diamine.

EXAMPLE 3

A high molecular weight BPADA/SDAN polyetherimide was prepared using the following amounts of reactants.
BPADA: 3273.3 grams; 6.289 moles
SDAN: 1573.8 grams; 6.338 moles
ODCB: 16692.3 grams; 20% solids initially
CHCl₃: 2945.9 grams
PA: 14.7 grams; 0.0992 moles; 1.55 mole percent
DMAP: 63.17 grams The reaction of Example 1 was run using a 10-gallon stainless-steel Brighton reactor, with a circulating-oil jacket, coiling coil and turbine blade impeller and fitted with a reflux condenser, addition funnel and nitrogen blanket. The reaction ran for 43.5 hours at the following temperatures.

| Time (mins.) | Temp. (°C.) | Notes |
|---|---|---|
| 0 | 26 | Reactants charged. |
| 82 | 110 | Observed water in distillate |
| 95 | 111 | Water in distillate; removed 300 mls distillate, replaced with 300 mls CHCl₃; this exchange process was repeated several times |
| 120 | 112 | Exchanged a total of 2 liters of distillate for CHCl₃. |
| 135 | 111 | Collected a total of about 120 mls water. |
| 145 | 113 | Homogeneous solution. |
| 175 | 117 | Exchanged a total of 3 liters. |
| 202 | 121 | Exchanged a total of 4 liters. |
| 250 | 127 | Collected a total of about 180 mls water. |
| 270 | 128 | Exchanged a total of 6 liters and collected a total of about 200 mls water. |
| 360 | 126 | To adjust temperature, some chloroform that was removed was not replaced. |
| 460 | 130 | Collected a total of 215 mils of water (visually); began to reflux solvent through sieve bed (4Å × 1/16", 8" high × 6" dia.) |
| 1200 | 134 | Solution very viscous. |
| 1790 | 129 | Molecular weight still too low, added |
| 2610 | 131 | 22.7 grams DMAP catalyst. Reaction terminated; 12 liters chloroform added. |

The polymer was anti-solvent precipitated with methanol in five batches. After filtering and drying, the product polymer was redissolved in 26 liters of chloroform and reprecipitated in six batches of methanol. It was then dried for twenty-four hours at room temperature, twenty-four hours at 60° C. and twenty-four hours at 100° C.

The gel permeation chromatography relative to polystyrene showed the following molecular weights at the various time intervals:
22 hours—44,200
30 hours—56,800
43 hours—80,400

The 43 hour sample had an IV of 0.671 dl./g. in chloroform and a glass transition temperature of 251° C.

The remarkable results of the inventive polymerization method can be evaluated when compared to the same reaction of monomer using solution polymerization in a single solvent system such as dichlorobenzene (see Example 4 below) or in a modified melt polymerization process (see Example 5 below).

EXAMPLE 4

BPADA: 51.79 grams; 0.0995 moles
SDAN: 24.73 grams; 0.0996 moles
ODCB: 392 grams; 300 mls.; 17% solids
PA: 0 grams; 0 moles; 0 mole percent
DMAP: 0.058 grams In using a single solvent polymerization system in orthodichlorobenzene under the following conditions, a polyetherimide polymer was produced with a significantly lower IV of 0.509 dl./g. Gel permeation chromatography found the molecular weight to be only about 43,300 (polystyrene standards).

The reaction mixture was heated slowly to reflux. Water and ODCB were removed and the ODCB was replaced with an equal amount of fresh solvent. The reaction ran for 24 hours, during which the solution viscosity increased until stirring was no longer possible. The mixture was then cooled to 100° C. and 100 mls. of chloroform were added to dissolve the polymer. The polymer was precipitated in methanol.

EXAMPLE 5

BPADA: 500.0 grams; 0.961 moles
SDAN: 240.4 grams; 0.968 moles
ODCB: 493 grams; 378 mls.; ~60% solids
PA: 2.25 grams; 0.015 moles; 1.55 mole %
DMAP: 9.65 grams Using a Modified Melt Polymerization process combining the monomers and ODCB in the amounts set forth above, in a 4CV Helicone ® reactor with intermeshing blades, the polymer product stuck to the walls of the Helicone ® mixture and could not be extruded from the Helicone ® mixture. The polymer appeared to have undergone some crosslinking thereby preventing the complete dissolution in chloroform and, therefore, the IV could not be measured. The reaction products became too viscous to stir once the molecular weight of the polymer exceeded the solubility limits of the orthodischlorobenzene. The following experimental results were obtained from the Helicone ® Melt Polymerization process which rendered an unsuitable polymer.

| | Experimental: | |
|---|---|---|
| Time (mins.) | Temp. (°C.) | Notes |
| 0 | 25 | Start w/580 mls. ODCB; Nitrogen sweep through bowl. |
| 10 | 134 | Water collected w/ODCB. |
| 30 | 143 | Amic acid seen; high distillate rate of water and ODCB; polymer began to dissolve. |
| 55 | 146 | 20 mls. water collected thus far. |
| 87 | 171 | Distillate collection continuing. |
| 100 | 197 | ~60% solids reached; fresh ODCB added to maintain this concentration. |
| 145 | 249 | Polymer did not seem to be miscible with ODCB. |
| 170 | 288 | Viscosity too high; run terminated. |

While the invention has been described in terms of the preferred embodiments, those skilled in the art will recognize that the specific configurations, steps and parameters may be varied in the practice of the invention by those skilled in the art without departing from the spirit of the invention, the scope of which is defined by the appended claims Having just described our invention what is claimed is:

1. A method for preparing a high molecular weight polyetherimide polymer comprising the steps of:
    dissolving a diamine monomer and a dianhydride monomer in a dual solvent system comprised of at least two solvents, chloroform and a second solvent having a relatively high boiling point characteristic such that when said first and second solvents are mixed together, the boiling point of the dual solvent system is at least as high as the temperature at which the polyetherimide is formed; and
    heating said dual solvent system containing said dianhydride and diamine monomers to a temperature at which polymerization to said polyetherimide polymer occurs.

2. A method according to claim 1 further comprising the additional step of:
    refluxing said heated system such that aqueous condensation in the reflux distillate is removed and simultaneously recirculating any evaporated solvent into the dual system.

3. A method according to claim 1 where said diamine is a dianiline.

4. A method according to claim 2 where said diamine is a dianiline.

5. A method according to claim 3 wherein the dianiline is 4,4'-sulfonyl dianiline.

6. A method according to claim 4 wherein the dianiline is 4,4'-sulfonyl dianiline.

7. A method according to claim 1 wherein the dianhydride is bisphenol A dianhydride.

8. A method according to claim 2 wherein the dianhydride is bisphenol A dianhydride.

9. A method according to claim 1 wherein said second solvent is a halogenated aromatic compound.

10. A method according to claim 2 wherein said second solvent is a halogenated aromatic compound.

11. A method according to claim 1 wherein said second solvent is ortho-dichlorobenzene.

12. A method according to claim 2 wherein said second solvent is ortho-dichlorobenzene.

13. A method for preparing a high molecular weight polyetherimide polymer comprising the steps of:
    dissolving 4,4'-sulfonyl dianiline and 2,2-bis[4-(3,4-dicarboxyphenoxy)phenyl]propane dianhydride in a dual solvent system comprised of a minor amount of chloroform and a major amount of o-dichlorobenzene; and
    heating said dual solvent system containing said monomer to a temperature of at least about 125° C.; and
    refluxing said system wherein any aqueous condensation in the distillate is removed and any evaporated solvent is recirculated into said dual solvent system.

14. A method according to claim 13 wherein said adding step further comprises the addition of a catalyst and a chain stopper.

15. A method according to claim 14 wherein said catalyst is 4-dimethylaminopyridine or a phenylphosphinate.

16. A method according to claim 14 wherein said chain stopper is phthalic anhydride or a monofunctional aromatic amine.

* * * * *